(12) United States Patent
Ponder

(10) Patent No.: US 11,345,296 B2
(45) Date of Patent: May 31, 2022

(54) SIDE UNDERRIDE GUARD

(71) Applicant: Perry Ponder, Tallahassee, FL (US)

(72) Inventor: Perry Ponder, Tallahassee, FL (US)

( * ) Notice: Subject to any disclaimer, the term of this patent is extended or adjusted under 35 U.S.C. 154(b) by 614 days.

(21) Appl. No.: 15/649,243

(22) Filed: Jul. 13, 2017

(65) Prior Publication Data
US 2018/0118143 A1 May 3, 2018

Related U.S. Application Data

(60) Provisional application No. 62/361,830, filed on Jul. 13, 2016.

(51) Int. Cl.
*B60R 19/56* (2006.01)
*B62D 35/00* (2006.01)

(52) U.S. Cl.
CPC .......... *B60R 19/565* (2013.01); *B62D 35/001* (2013.01)

(58) Field of Classification Search
CPC ............................ B62D 35/001; B60R 19/565
USPC ........................................................ 293/126
See application file for complete search history.

(56) References Cited

U.S. PATENT DOCUMENTS

| | | |
|---|---|---|
| 6,974,178 B2 | 12/2005 | Ortega |
| 7,093,889 B2 | 8/2006 | Graham |
| 7,780,224 B2 | 8/2010 | Roush |
| 7,942,468 B2 | 5/2011 | Bolvin |
| 7,950,721 B1 | 5/2011 | Peterson |
| 8,162,384 B2 * | 4/2012 | Giromini ............. B62D 25/168 296/180.4 |
| 8,376,450 B1 | 2/2013 | Long |
| 8,579,359 B2 | 11/2013 | Brown |
| 8,678,473 B2 | 3/2014 | Dayton |
| 8,801,078 B2 | 8/2014 | Brown et al. |
| 9,199,676 B2 | 12/2015 | Brown et al. |
| 9,409,610 B2 | 8/2016 | Baker et al. |
| 9,487,171 B2 | 11/2016 | Rogers |
| 2008/0116702 A1* | 5/2008 | Enz ........................ B60R 19/56 293/128 |
| 2011/0233960 A1 | 9/2011 | Heinz |
| 2013/0169000 A1 | 7/2013 | Reiman |
| 2015/0239513 A1 | 8/2015 | Lofton |
| 2016/0207484 A1* | 7/2016 | Rogers .................. B60R 19/565 |

\* cited by examiner

*Primary Examiner* — D Glenn Dayoan
*Assistant Examiner* — Dana D Ivey
(74) *Attorney, Agent, or Firm* — William Holliman

(57) ABSTRACT

A side underride guard for attachment to the underside of a trailer comprising two guard rails longitudinally positioned below the outer sides of the trailer, with each guard rail attached to the trailer by a plurality of vertical support members and with the two guard rails attached to each other and the trailer by a plurality of diagonal support members. The side underride guard further supports and incorporates an aero skirt for reducing trailer drag.

4 Claims, 15 Drawing Sheets

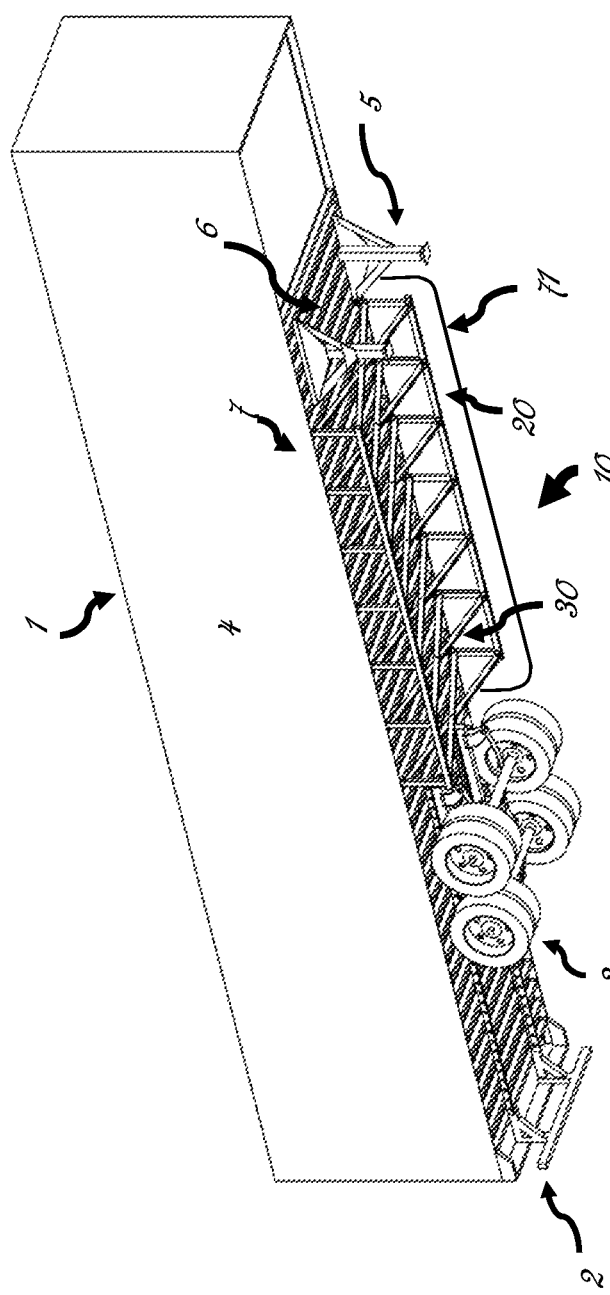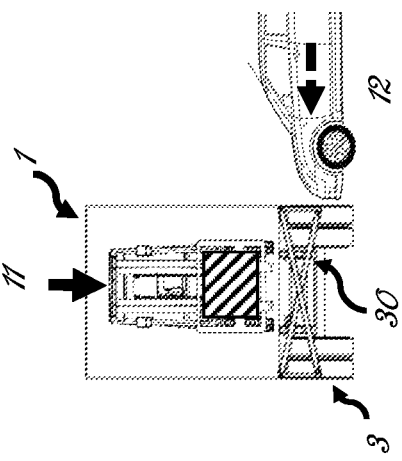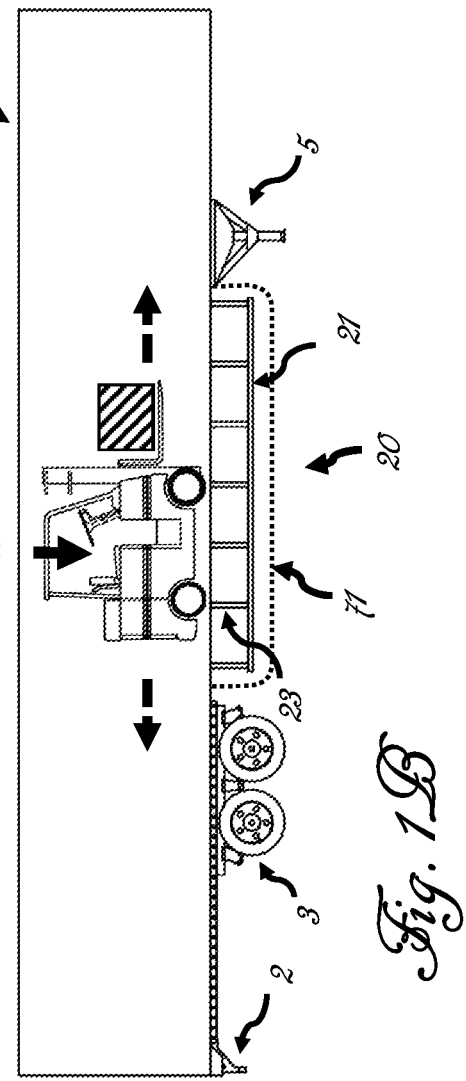

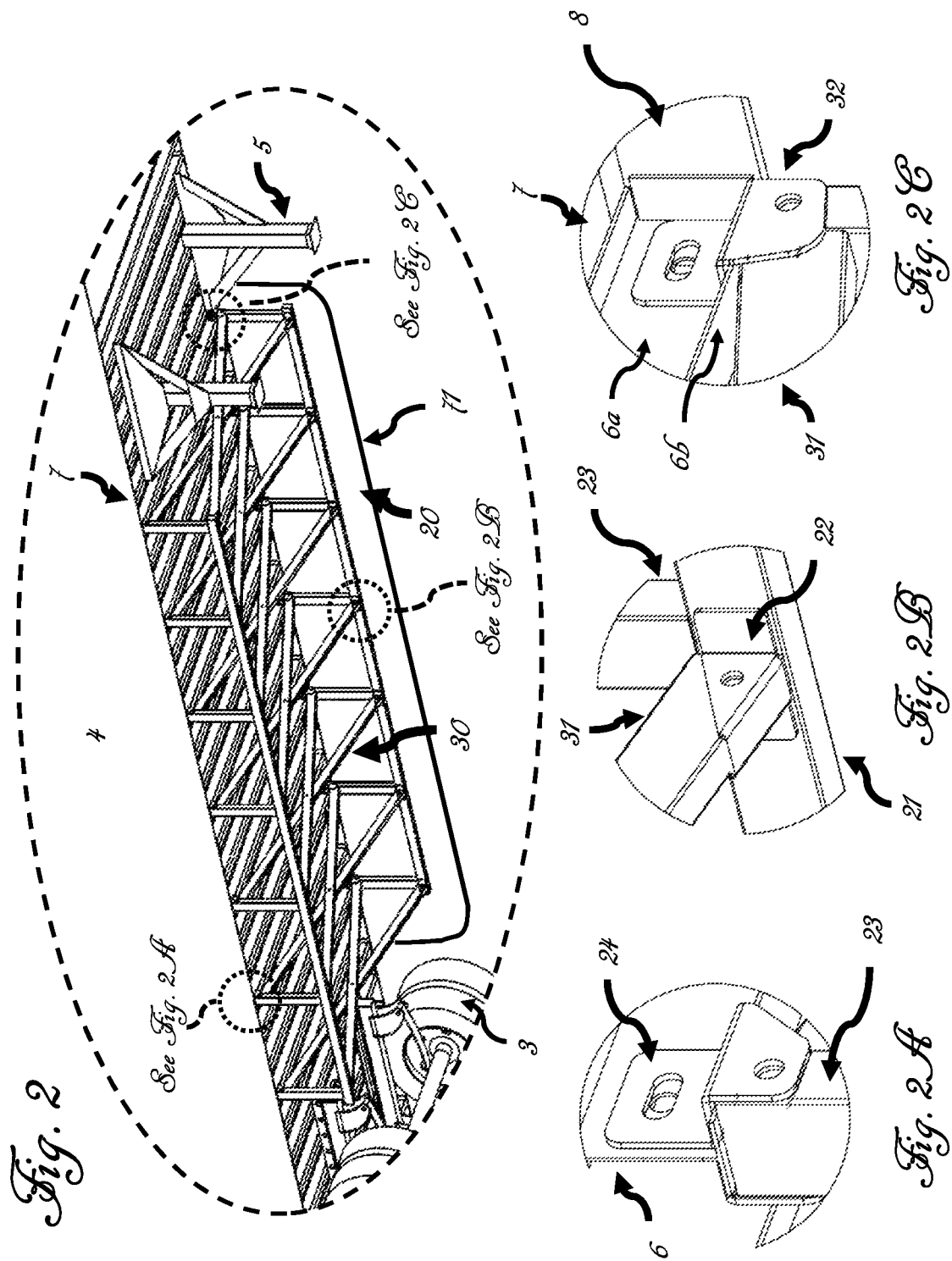

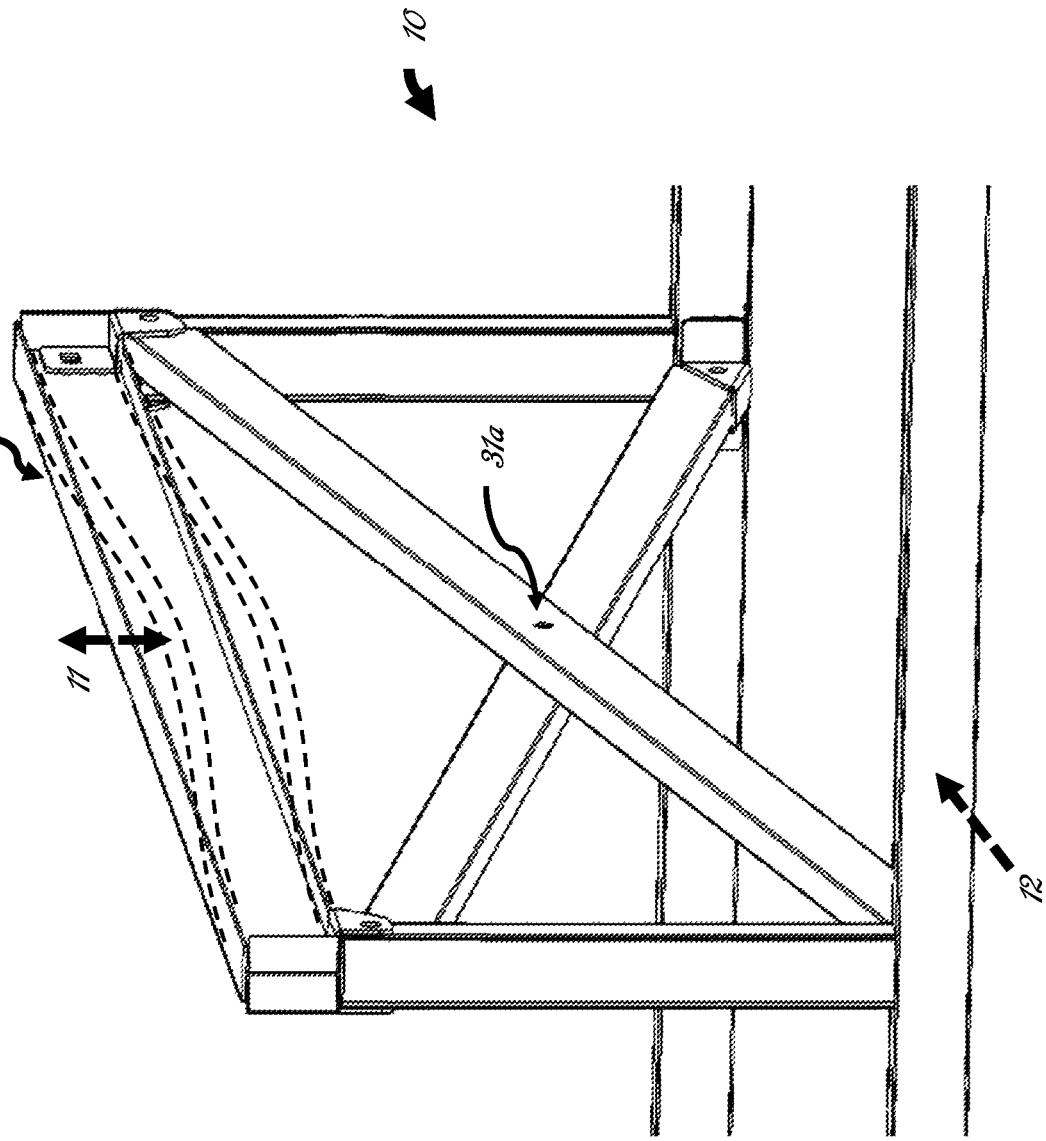

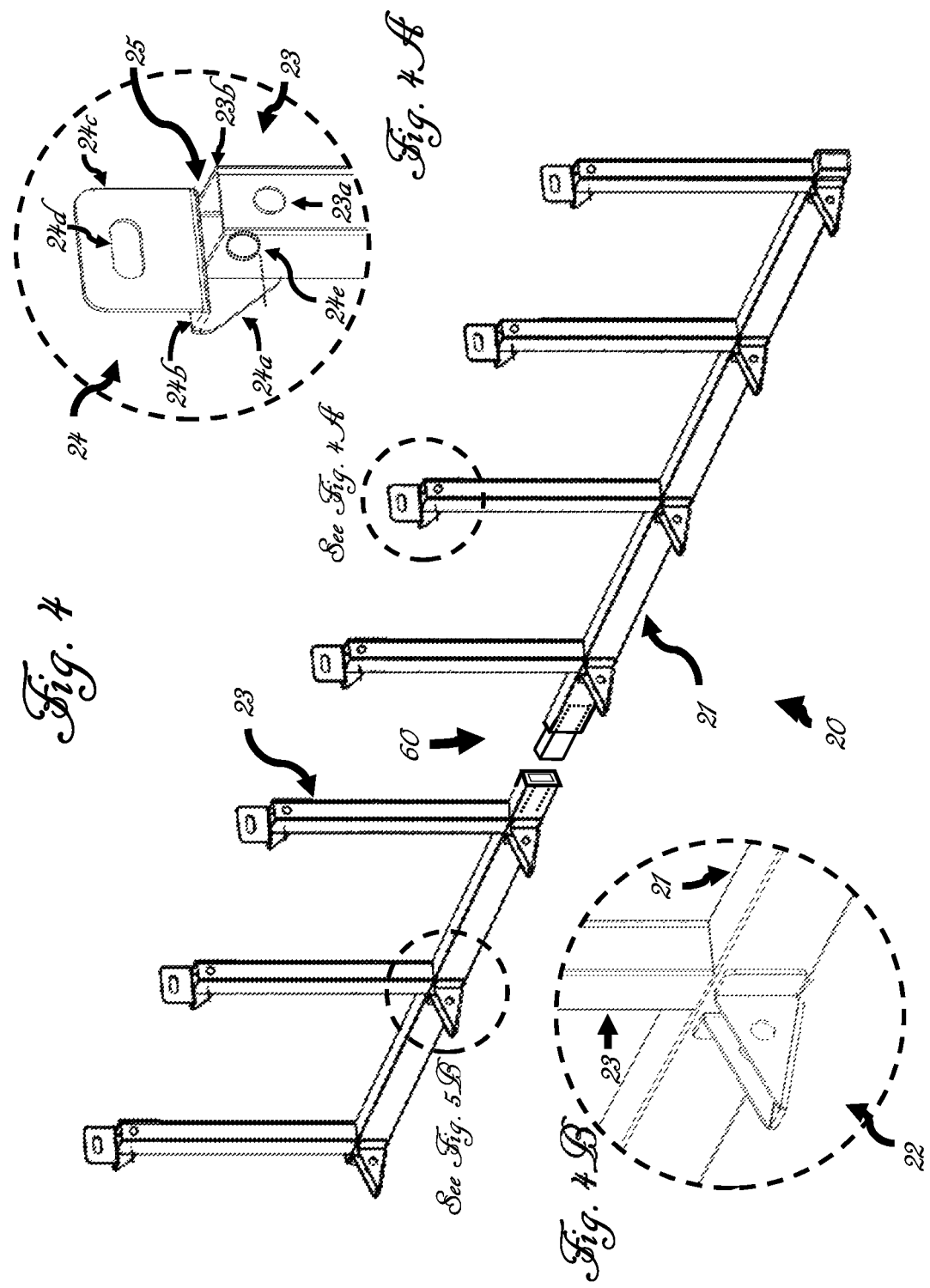

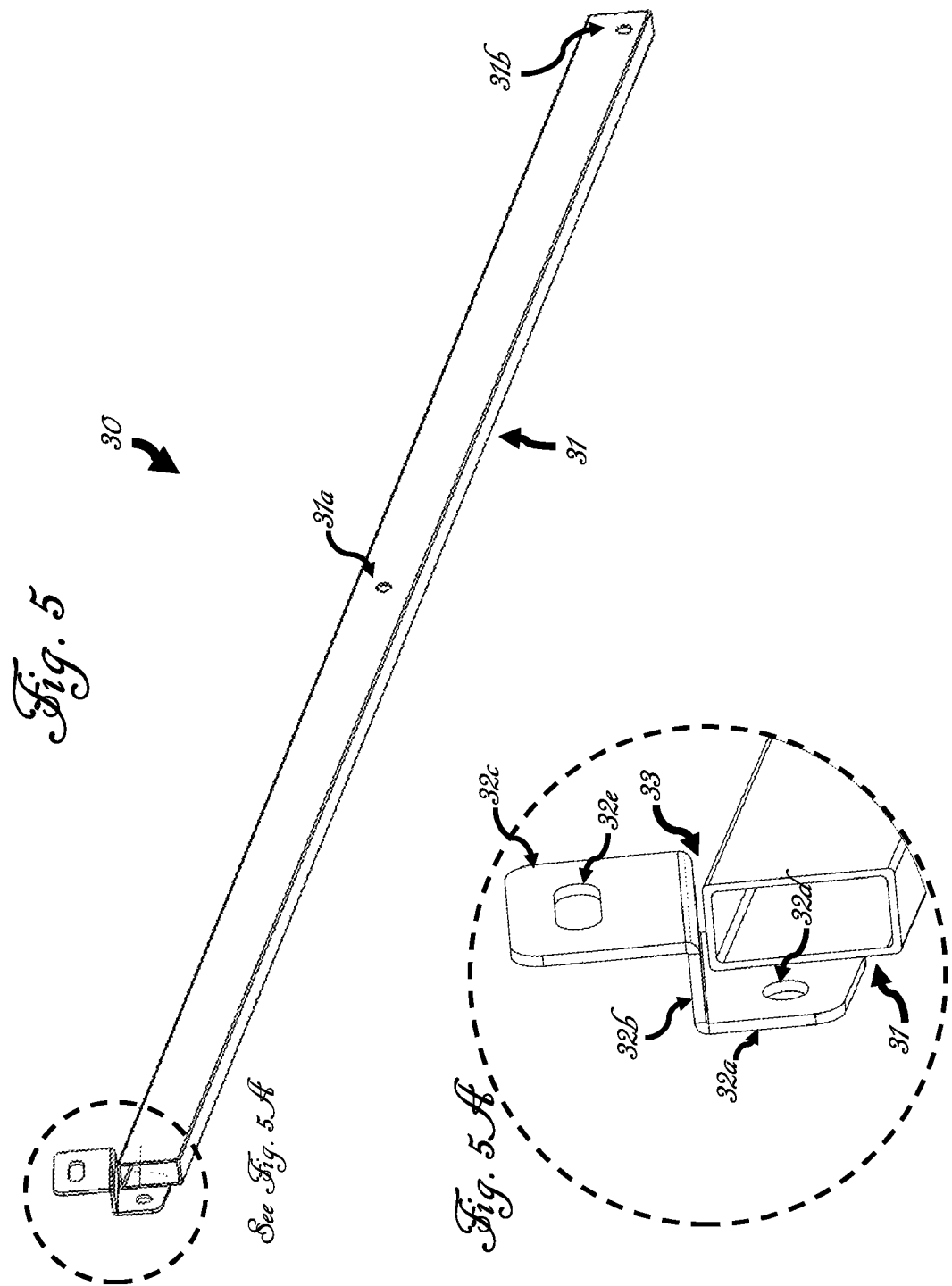

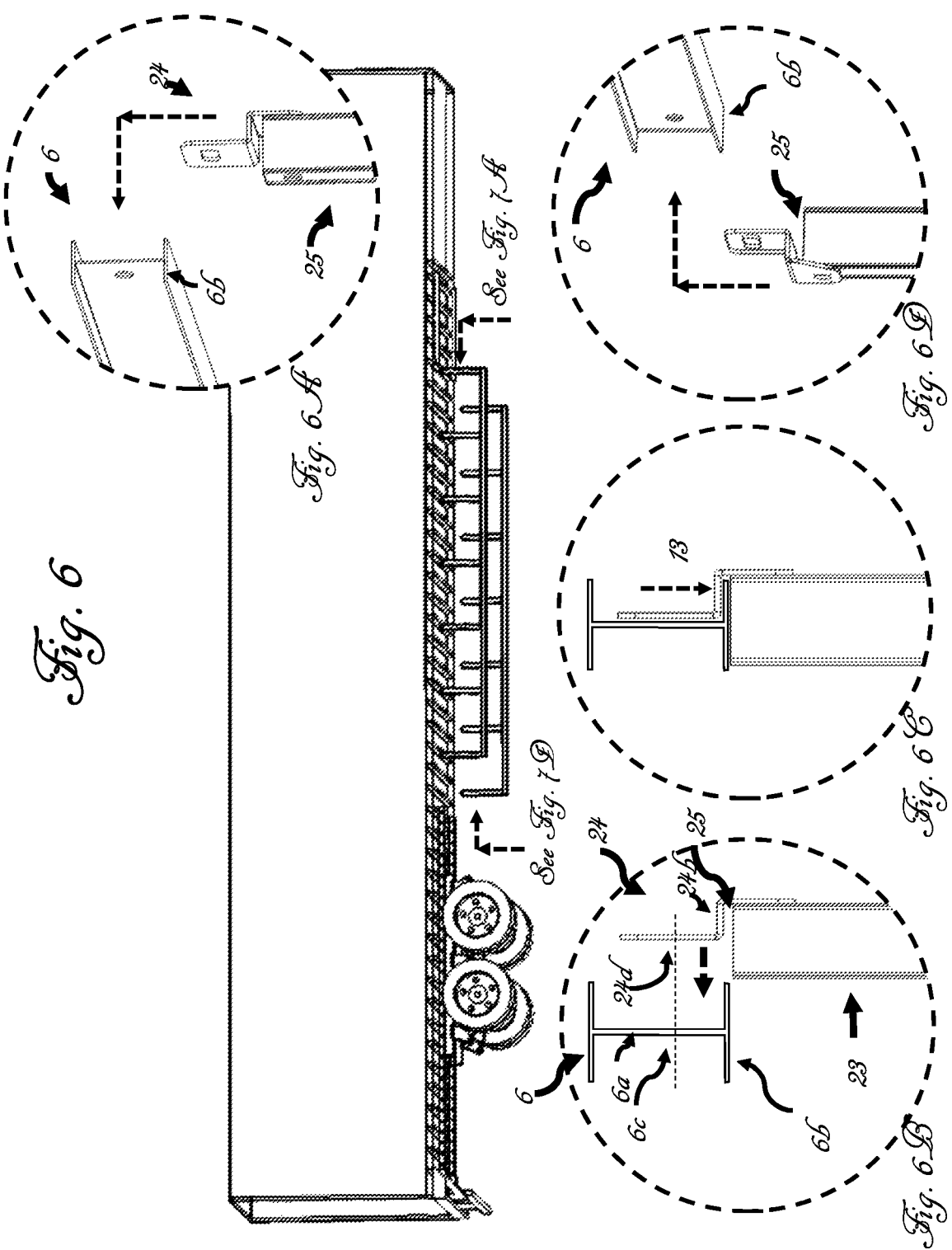

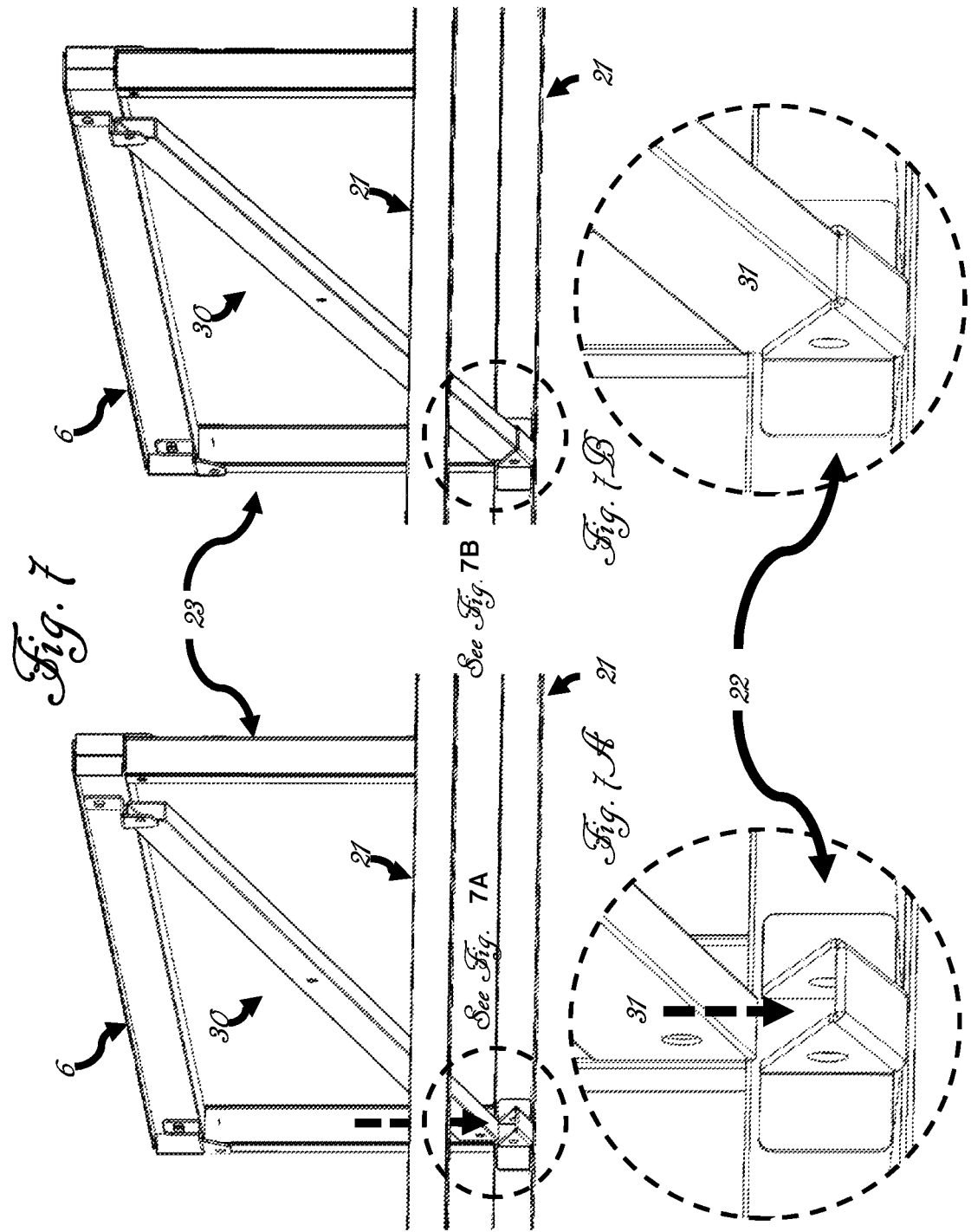

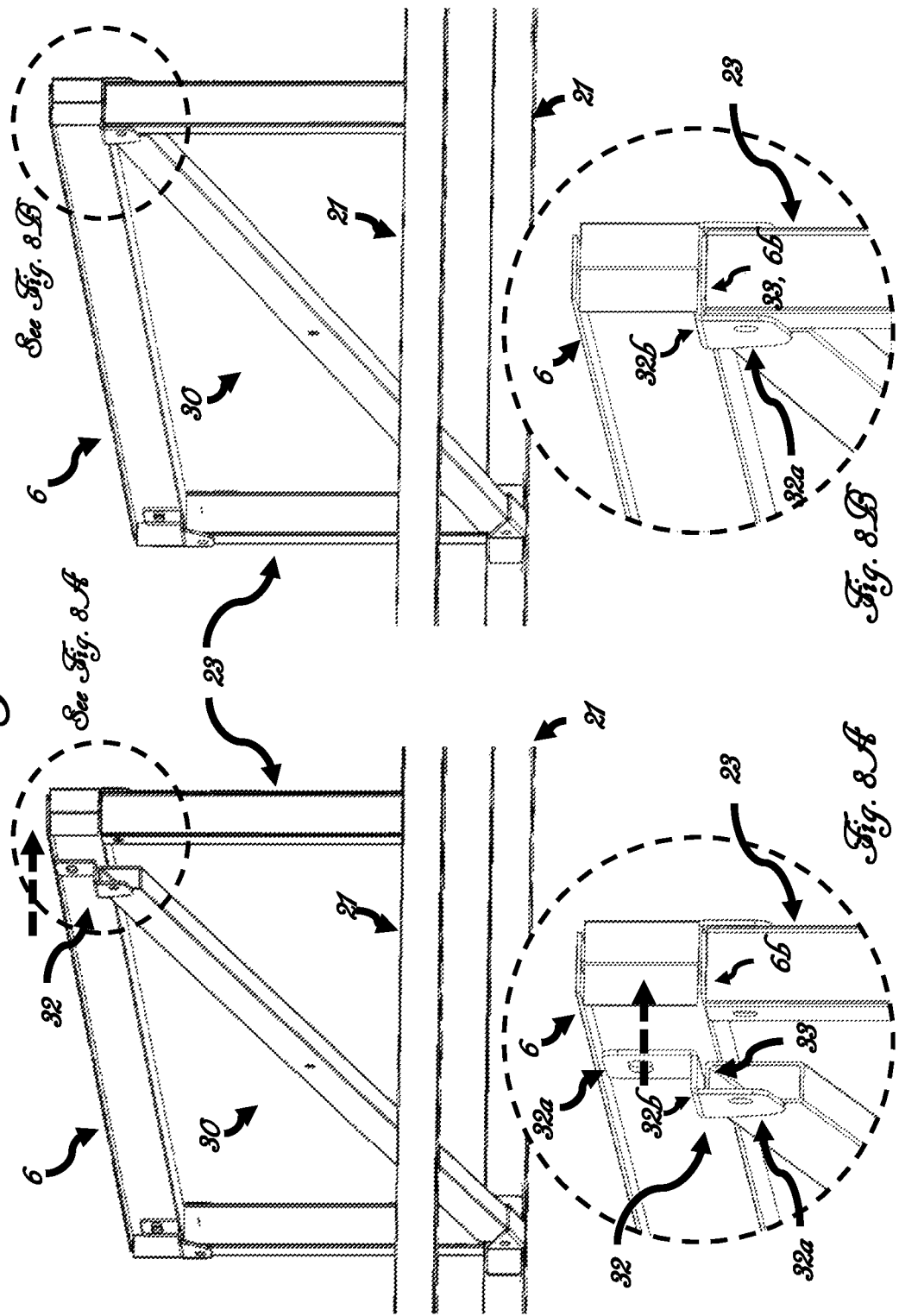

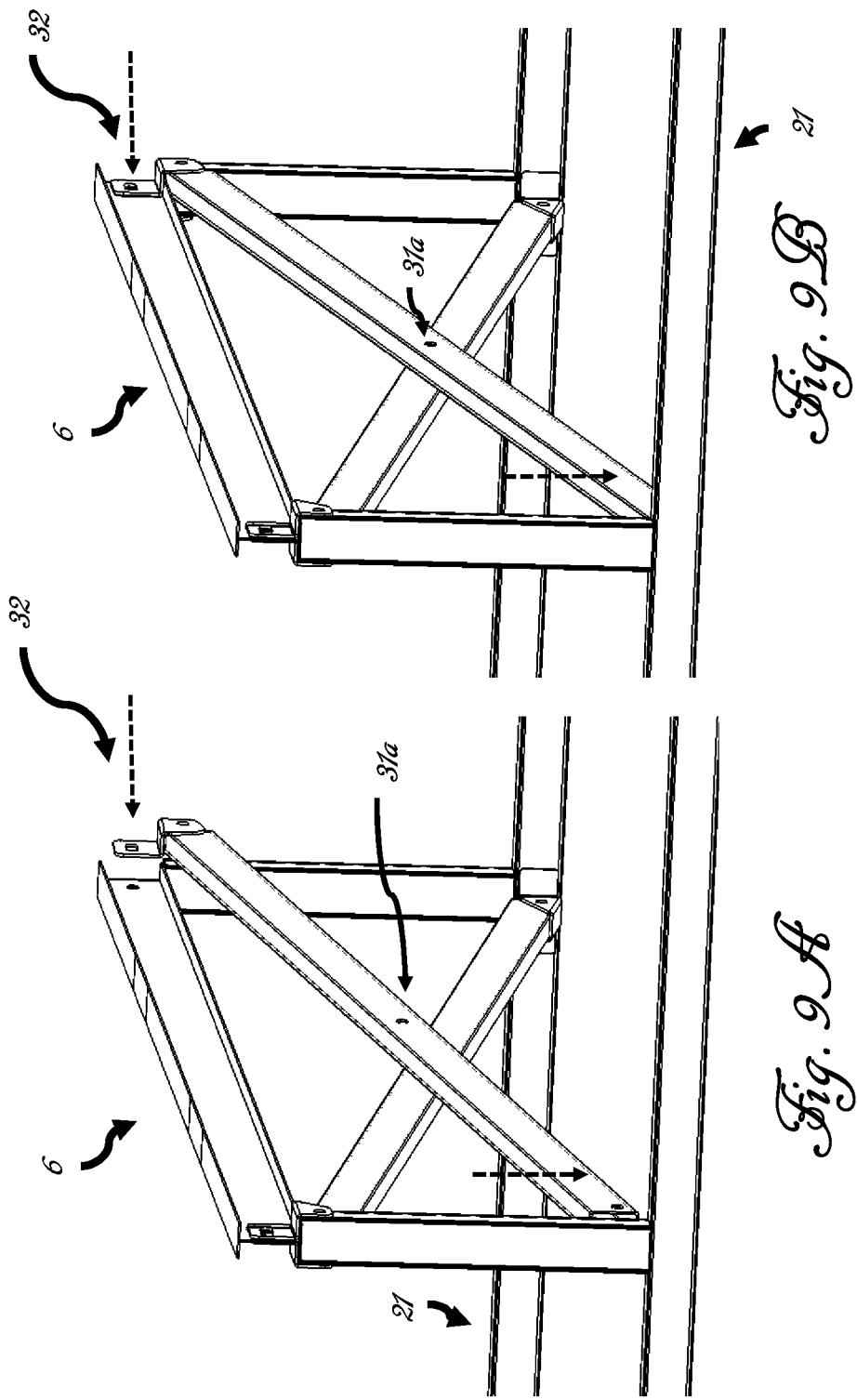

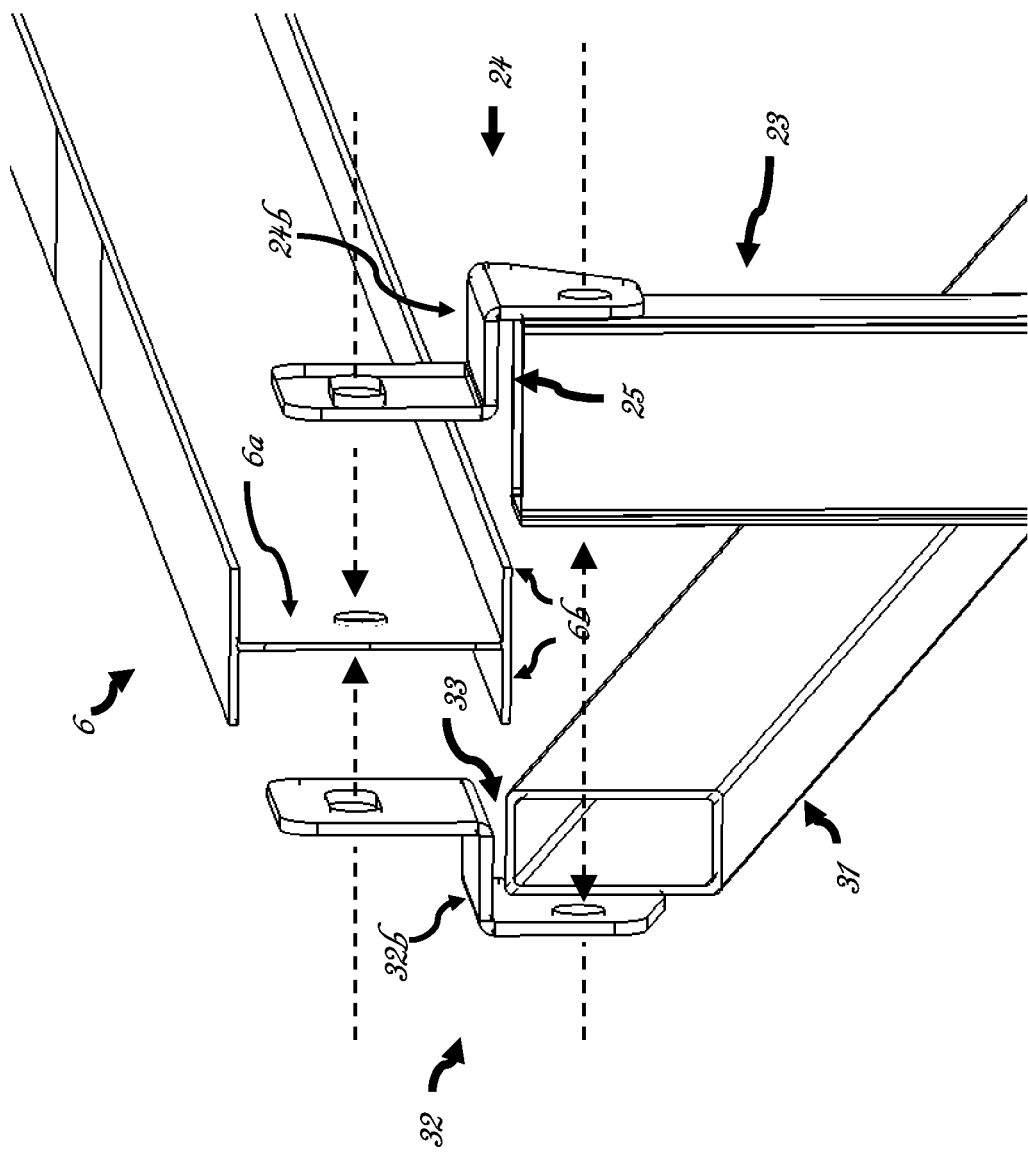

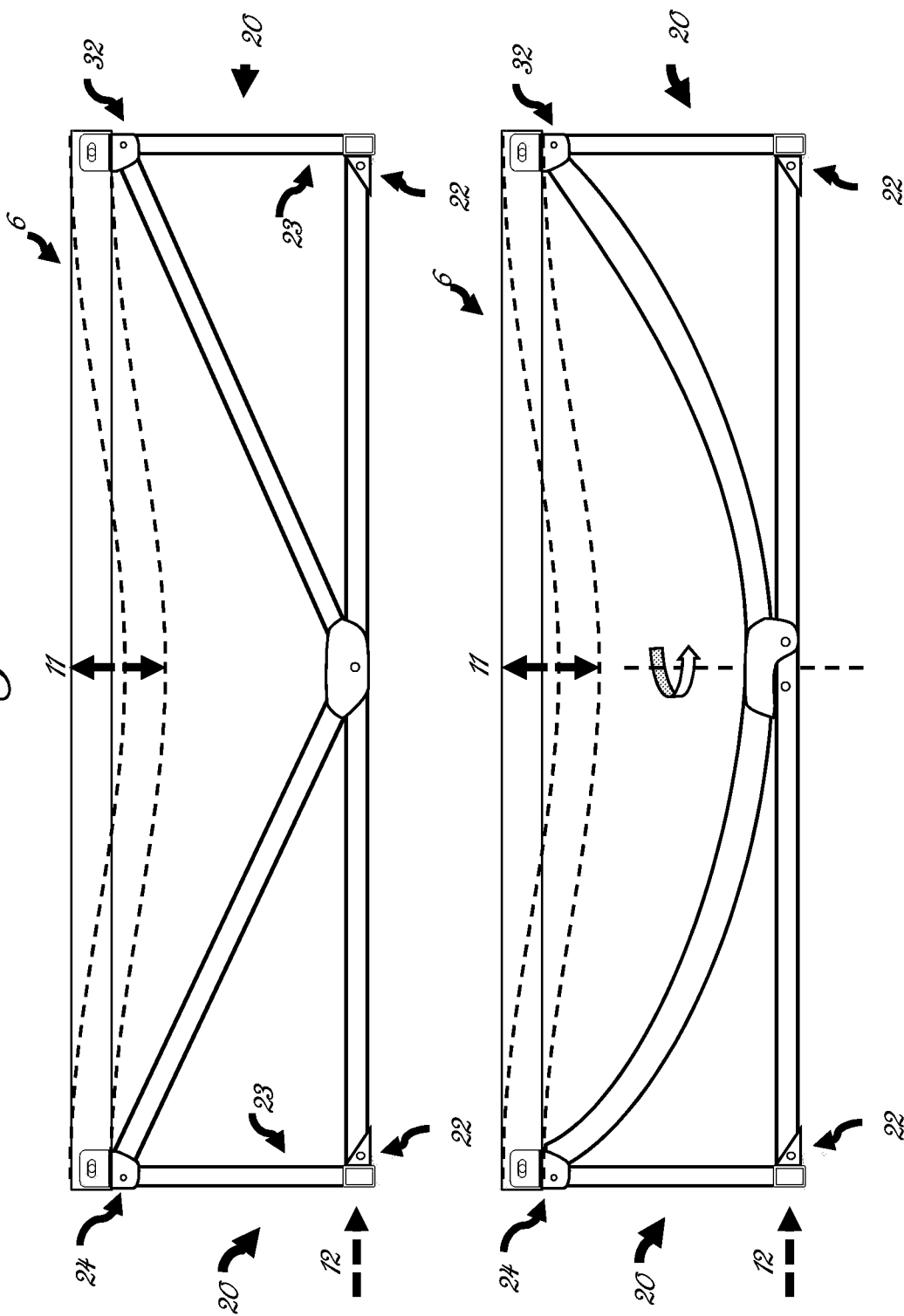

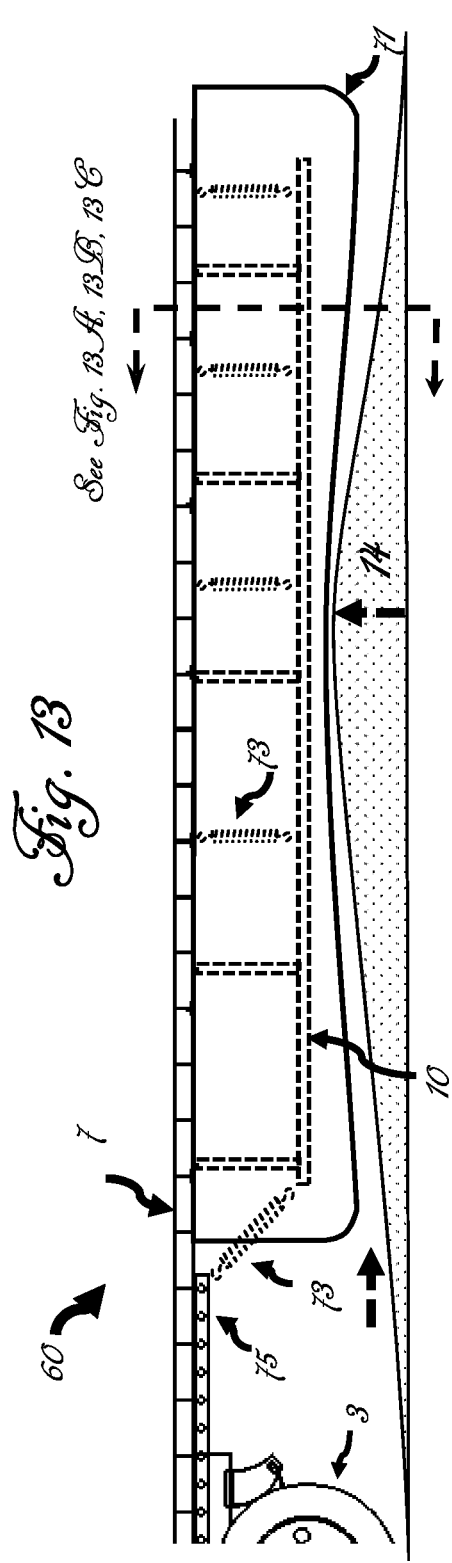
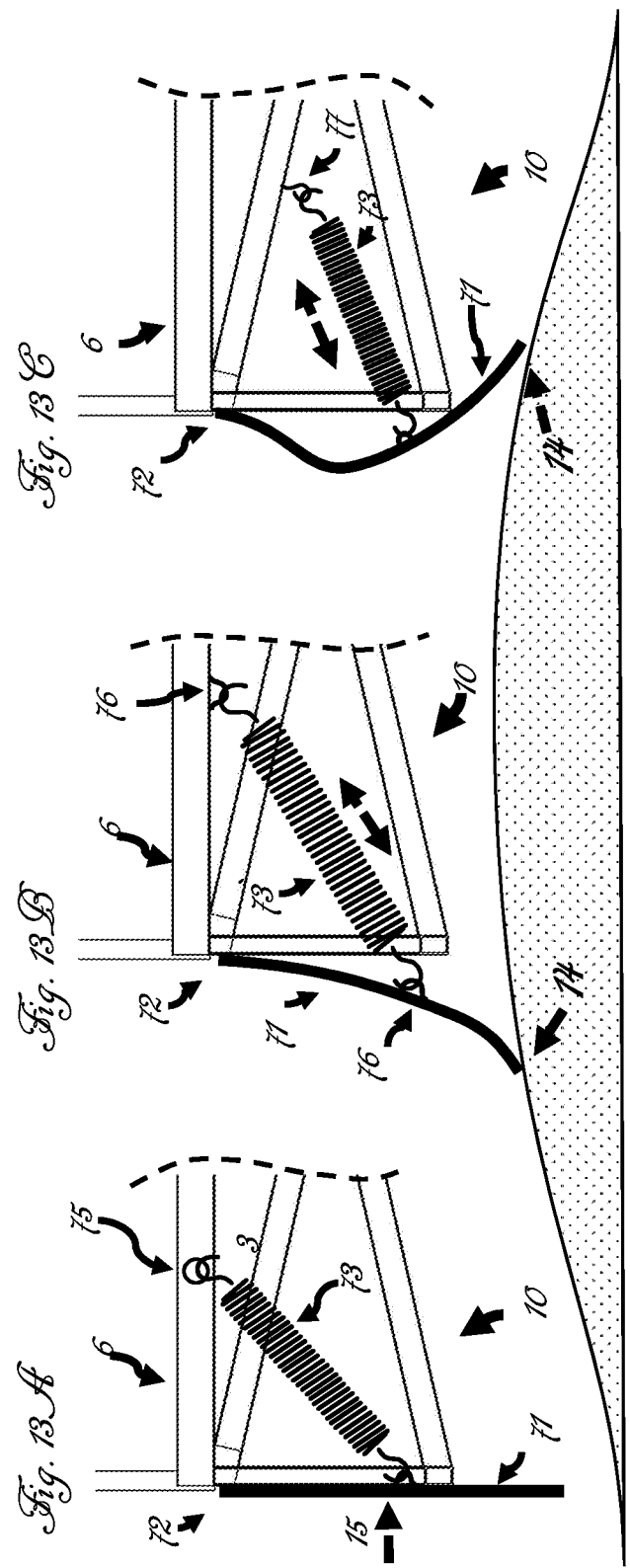

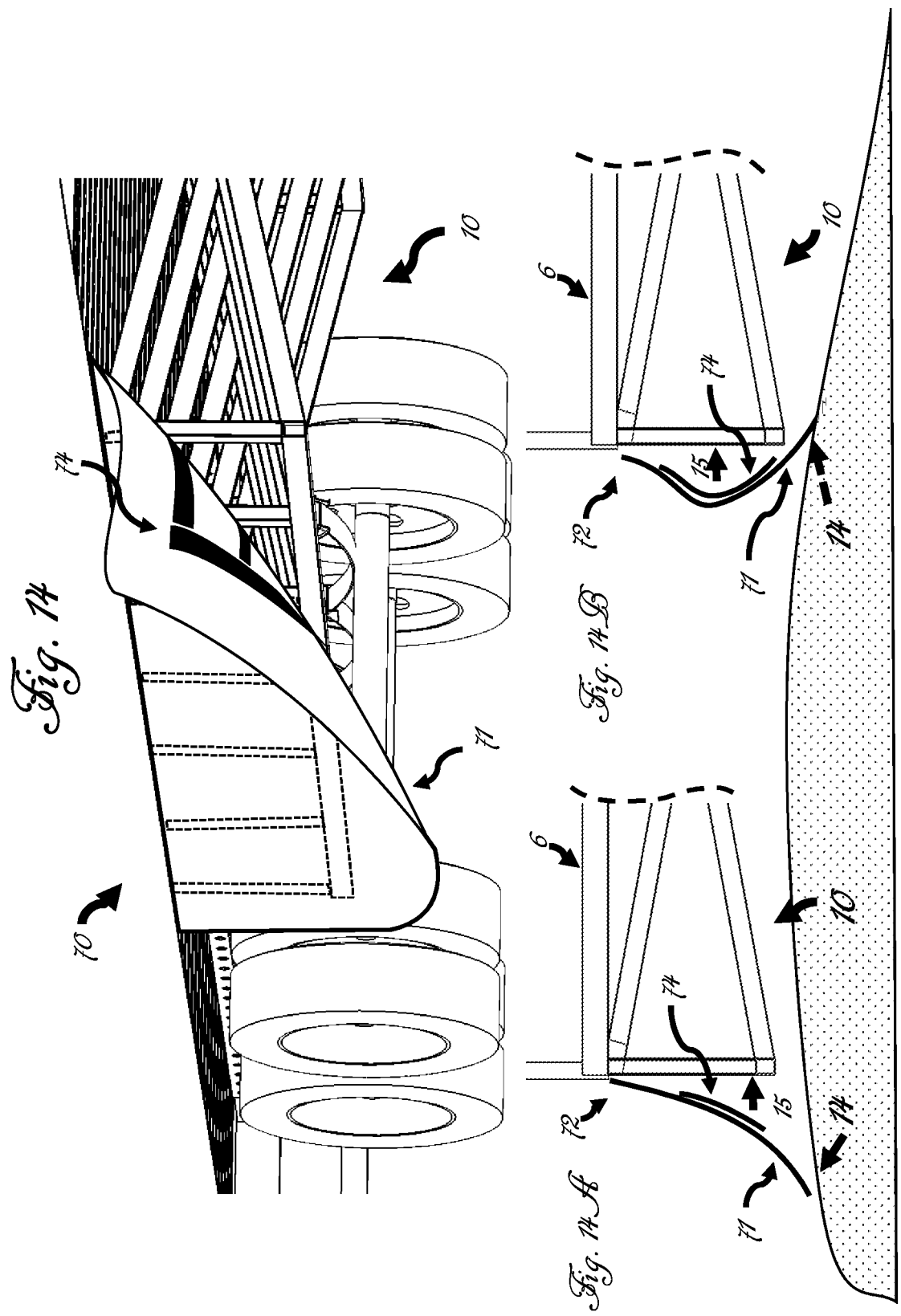

SIDE UNDERRIDE GUARD

CROSS-REFERENCES TO RELATED APPLICATIONS

This application claims priority under 35 U.S.C. § 119(e) to U.S. Provisional Application Ser. No. 62/361,830 filed Jul. 13, 2016, by Perry Ponder, which is incorporated herein by reference in its entirety.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of trailer safety devices. Specifically, the present invention is a side underride guard to prevent a passenger car from traveling under the side of a conventional trailer pulled by a tractor on a highway.

2. General Background

The area between the tractor and trailer wheels is often called the "space of no hope" for passenger vehicles unfortunate enough to strike this area during a traffic accident. Because the lower edge of a trailer's side sits at about head level for seated passengers in cars, collisions in this area of the trailer result in the passenger vehicle's bumper running under the trailer causing the collision to occur with the weaker upper components above the hood of the car. The result of this "underride" is passenger compartment intrusion or "PCI." PCI caused by trailer underride compromises the occupant crash survival space allowing crush into or penetration through the vehicle's windshield, A-pillars and roof. PCI allows the trailer and often the vehicle's roof contact with the occupant's vulnerable head and neck area, causing severe brain injury, paralysis, or death.

BRIEF SUMMARY OF THE INVENTION

The present invention is a side underride guard mountable under a standard van-type trailer (the typical trailer attached to a tractor-trailer combination commonly referred to as an "18 wheeler.") The side underride guard of the present invention is of modular construction to ease installation. Generally, it includes a plurality of "x-brace" structures that are connected via a pair of horizontal members. Preferably, the x-braces attach to the trailer floor at opposing ends of the transverse floor beams that support the trailer's floor. This connection placement allows the trailer floor to flex while the trailer is being loaded/unloaded. The side underride guard can also incorporate and support aero panels (aeroskirt) that are commonly used to reduce drag by redirecting air flow around/under a trailer.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 1A shows a isometric view of the side underride guard attached to the trailer underside with the curb-side skirt removed for clarity.

FIG. 1B is a side view of the trailer with inventive side guard attached showing the forklift truck movement that the side guard is designed accommodate.

FIG. 1C is an end view of inventive side underride guard and side skirt system installed on the trailer showing also both the fork truck it is design to account for and a passenger vehicle it is meant to prevent from underriding.

FIG. 2 is a close-up isometric view of the side underride guard and aero-skirt system attached to the trailer.

FIG. 2A shows the vertical bracket clamped onto the end of the trailer floor cross-member I-beam viewed from outside the trailer.

FIG. 2B shows the end of the diagonal resting in the stirrup bracket.

FIG. 2C shows the opposing diagonal bracket clamped onto the end of the trailer floor cross-member I-beam viewed from underneath the trailer.

FIG. 3 shows a single truss location consisting of a set of diagonal and vertical members at an I-beam which flexes due to floor loading.

FIG. 4 shows the side guard's sideface assembly.

FIG. 4A shows is a close-up of the vertical bracket attached to the end of the vertical.

FIG. 4B shows the stirrup bracket attached to the horizontal guard rail.

FIG. 5 shows the diagonal and a closeup view of the diagonal bracket.

FIG. 5A is a closeup view of the diagonal bracket attached to the diagonal.

FIG. 6 shows the installation of the side face onto one side of the trailer floor.

FIG. 6A depicts the installation motion of the first side face onto the trailer floor.

FIG. 6B shows the how the side face slides onto the trailer floor crossmember lower flange.

FIG. 6C shows how the side guard's side face hangs on the trailer crossmember lower flange.

FIG. 6D shows the installation motion of the second and opposite side face onto the trailer floor.

FIG. 7 shows the installation of the lower end of the diagonal into the stirrup bracket.

FIG. 7A is a close-up depicting the movement of the diagonal end into the stirrup bracket.

FIG. 7B is a close-up showing the diagonal installed into the stirrup bracket.

FIG. 8 shows the installation of the upper end of a diagonal.

FIG. 8A is a close-up of the installation movement of the diagonal bracket onto the trailer floor.

FIG. 8B is a close-up of the diagonal bracket installed and coupled simultaneously with the trailer floor crossmember and the side face vertical and vertical bracket.

FIG. 9A shows the installation movement of the opposing diagonal cradled into its stirrup bracket.

FIG. 9B shows coupling of an opposing diagonal with opposing side face bracket and the trailer floor transverse beam.

FIG. 10 shows an exploded view of the simultaneous coupling of diagonal and vertical side guard supports with the trailer transverse beam and each other.

FIG. 11 shows side guard configurations that have alternate lateral support configurations.

FIG. 13 shows the spring loaded flexible skirt attachment encountering a ground-based obstacle.

FIG. 13A shows the skirt held pressed against the side underride guard with the opposite end of the spring attached to an opening in the trailer floor.

FIG. 13B shows the skirt flexing away from the side underride guard with an end of the spring hooked to shackle in the trailer floor.

FIG. 13C shows the skirt flexing under the side underride guard and upwards due to a ground obstacle with one end of the spring hooked to the side underride guard.

FIG. 14 shows magnetic strips affixed to the inside face of the skirt panel aligned to mate with the side underride guard frame.

FIG. 14A shows the aeroskirt with magnetic strips flexing away from the side guard in the presence of ground structures.

FIG. 14B shows the base of the aeroskirt with magnetic strips flexing up from the side guard in the presence of ground structures.

DETAILED DESCRIPTION OF THE INVENTION THROUGH THE DRAWINGS

Figure 2D:
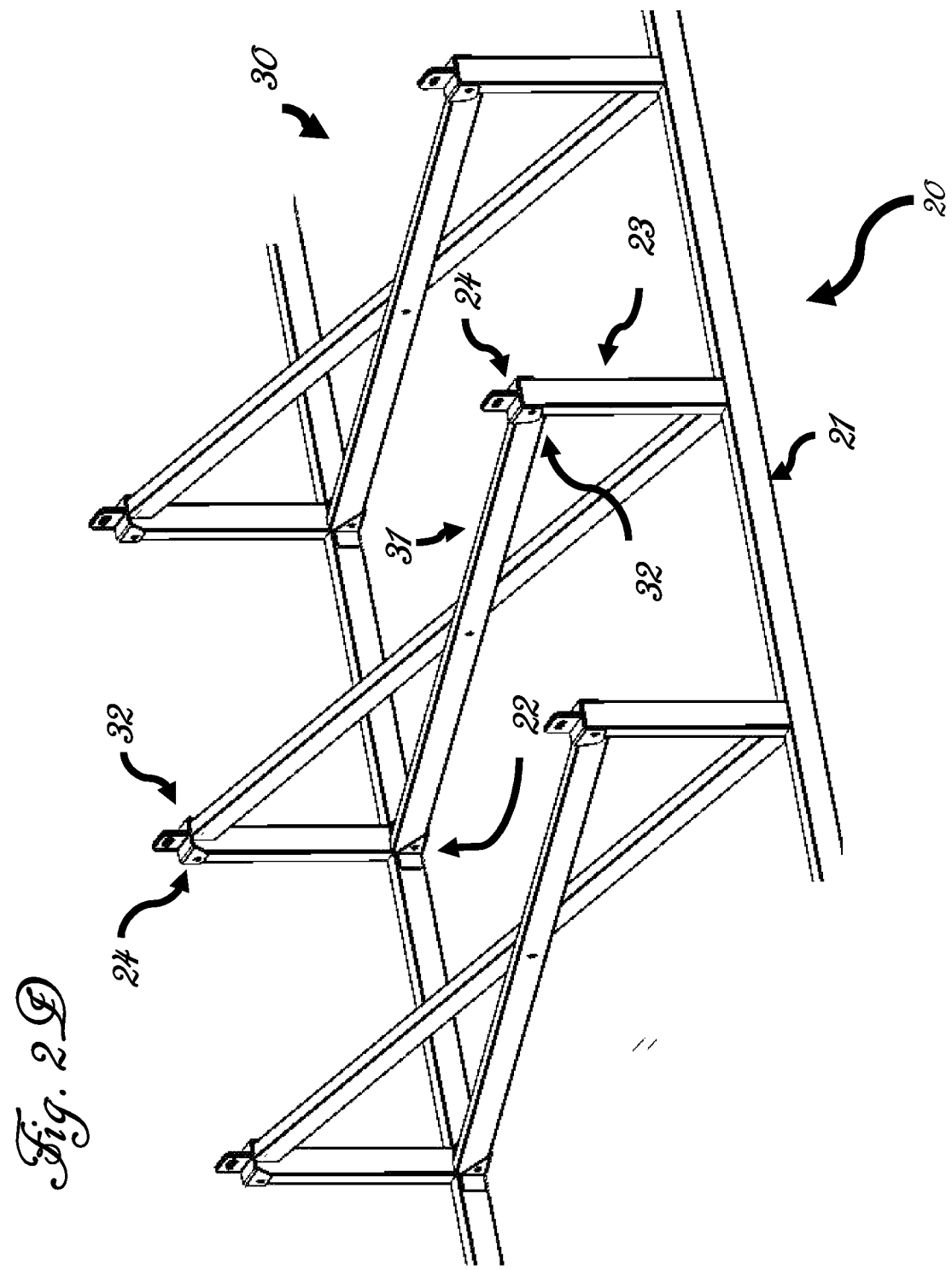
FIG. 2D shows an isometric view of a portion of the x-brace side guard structure assembly, but detached from the trailer.

Referring to FIG. 1A, the area between a semi-tractor drive wheels and semi-trailer's wheels 3 is often called the "space of no hope" for those unfortunate enough to strike this area during a traffic accident. Because the lower edge of a trailer's side 4 sits at about three and a half off the ground, collisions with passenger vehicles in this area of the trailer result in the passenger vehicle's bumper riding under the trailer 1 causing the collision to occur with the weaker upper components above the hood of the car. The result of this underride or underride is passenger compartment intrusion or PCI. PCI caused by trailer underride compromises the occupant crash survival space allowing crush into or penetration by the trailer's floor 7 through the vehicle's windshield, A-pillars and roof. PCI allows the trailer and often the vehicle's roof contact with the occupant's vulnerable head and neck area, causing severe brain injury, paralysis, or death. A side underride guard 10 is a solution to address the height difference between the semi trailer floor 7 and passenger vehicles which leads to PCI and the associated injuries. While the concept of side underride protection for trailers has been around since at least the time that the FHWA contemplated a Federal Motor Vehicle Safety Standard for side underride guards, an approach to configuring the guard in a manner that installs efficiently and best integrates with the existing semi trailer structure and associated equipment is needed.

Trailers are loaded and unloaded by hand, by hand truck or dolly, by pallet jack and often by forklift (as shown in FIG. 1B) creating a force 11 that can create large deflections 11, FIG. 3 on the trailer floor and its transverse beam supports 6 which are typically I-beams or channel beams. A side underride guard if it is to include lateral bracing against a lateral force generated by a passenger car 12 FIG. 1C has only this floor area to attach. The present invention solves the problem of loading deflections interacting with a side underride guard in an adverse way through innovative configuration and attachment means.

Since side underride guards are a device not currently offered by trailer manufacturers as factory standard safety equipment, the ease of installation the invention offers in a post-production setting by way of innovative its bracket setup is needed. The present invention also facilitates a means for efficient installation by reducing the number of parts and guard to trailer attachment points.

Finally, a side underride guard presents a natural frame upon which to mount aerodynamic side panels or side skirts. Side skirts are increasingly popular and present on many trailers (without side underride protection). They occupy the same area between a trailer and tractor tires which would be occupied by a side underride guard. Side skirts are meant to direct airflow away from the rear tires thereby reducing aerodynamic drag and increasing fuel economy. They do not possess the strength to redirect a passenger vehicle. To maximize drag reduction, aero-skirts have a low ground clearance. If these aero-skirts were unyielding, the trailer would 'high-center' creating the potential for the tractor-trailer combination to become stuck on ramps, driveways and railroad crossings. As a result aero-skirts have been designed to flex or bend out of the way from the inevitable contact with ground-base obstructions, but stiff enough to remain stationary while resisting highway airflow. Current skirt frames and attachments that flex with contact to ground-based objects are not compatible with a rigid side underride guard. When combined with a rigid side guardrail, which is positioned lower than the trailer floor, but not as low as the bottom edge of a typical skirt, the skirt must flex around the lower edge of the side guard rail 21. The present invention also presents a skirt attachment arrangement for a side underride guard which allows flexing in the presence of ground obstructions in a way that prevents small radius bending of the skirt panel which would permanently kink the aero-skirt panel. The innovative attachment forces the skirt panel, along with its own elastic character, to rebound and remain pressed against the side guard frame in a normal aerodynamic position.

FIG. 1A shows the present invention side underride guard 10 installed and assembled on trailer 1. FIG. 1A shows an isometric view of the trailer 1 and side underride guard 10. The trailer 1 depicted is a box or van style trailer with side walls 4 and transverse transverse beams 6 supporting the trailer's floor 7. Most trailers come equipped with a rear underride guard 2 at the trailer's rear extremity. Similarly, the outside face of the side underride guard is positioned laterally at the trailer's side extremity, between the trailer tires 3 and the trailer's landing legs 5. For clarity in depicting the apparatus, a skirt is not shown on the curb side of the trailer, but is depicted on the road side 71. FIG. 1B is a side view of the side underride guard 10 and shows guard's side face 20, the axial guardrail 21, and the vertical 23. Inside the trailer is a forklift which creates a downward force 11 on the trailer's floor. FIG. 1C is a front view of the side underride guard 10 installed on the trailer 1 and shows the guard's diagonals 30. Inside the trailer is depicted a forklift creating load 11.

FIG. 2 is a closer isometric view of the side underride guard 10 installed on the trailer 1. As shown in FIG. 2A, when installed, vertical member 23 and vertical bracket 24 of side face 20 fit the contour of the trailer transverse beam. The end of the diagonal long member 31 cradles into the stirrup bracket 22 which is affixed to the inside face of the longitudinal guardrail 21 as shown in FIG. 2B. The opposite end of the diagonal long member 31 on one face a diagonal bracket 32, affixed in such a manner its contour fits both the end of the trailer transverse beam 6 and the end of the bracketless side of the vertical 21 as shown in FIG. 2C. FIG. 2d shows a portion of a side guard 10 with three "x-brace" structures (the combination of two diagonal members 30 and two vertical members 23) connected by two longitudinal guard rails 21. As is readily apparent, the total length of side guard 10 can be adjusted by incorporated more of less of the x-brace structures.

In such an assembled configuration as shown in FIG. 3, which depicts a single cross-bracing set, the side underride guard is braced through triangulation against the extreme force created by a potential impacting passenger vehicle, while leaving room for the floor and its transverse beam support 6 to deflect independently without transferring those deflections 11 to the side guard 10 whose divergent purpose and material of construction may make such deflections undesirable. While only one side of the trailer's extremity needs guarding during a particular accident event, this innovative cross-trailer approach and the paired and mirrored diagonals allows the opposing curb and road sides of the side underride guardrails to be joined by fasteners through center holes 31a causing both sides to work as a unit during a crash.

The inventive side underride guard 10 as shown in FIG. 1A is comprised of two basic components supplied to an installer. One component is the side face 20 shown in FIG. 4 which is comprised of an longitudinal guard rail 21 which once installed is situated generally parallel to and below trailer floor 7 at a level likely to intercept a car at is bumper level. A plurality of vertical members 23 extend upward from the longitudinal guard rail 21. These vertical members 23 have brackets 24 affixed by welding or other means to their upper end on one side—a left or right side as one faces the trailer side as show in FIG. 4A. Two side faces 20 are required per trailer but are identical and indistinct as to left or right (curbside or roadside). The vertical brackets 24 are shaped to have a lower vertical leg 24A flush with one side of the vertical member 23 then turning horizontal to form a horizontal leg 24B, parallel to the upper horizontal terminus or cut of the vertical member 23B, but leaving space or flange gap 25 (FIG. 4A) between the horizontal portion of the bracket 24B and terminus of the vertical member 23B. The bracket then turns vertically to form an upper vertical leg 24C. The vertical bracket 24 on its lower vertical leg 24A and the upper part of the vertical 23 have aligned co-axial holes, 24E and 23A, oriented longitudinally with the trailer length. The bracket's upper leg 24C also has a opening 24D to line up with hole drilled into the trailer floor transverse beam webbing 6C oriented longitudinally with trailer length as shown in FIG. 2A. As shown in FIGS. 2B, 4B, FIG. 7 and FIG. 10, to the inside surface of the longitudinal guardrail 21 of the side face 20 is affixed a stirrup bracket 22 into which the lower end of the diagonal 30, 31 is cradled during installation. Through the stirrup bracket 22 is a hole 22D oriented longitudinally and co axial with a hole at the end of the diagonal 31B once installed. Cradling in the stirrup bracket 22 also serves to hold the diagonal in place even if a fastener through its hole 22D were to vibrate loose during roadway travel. The side face 20 may be divided up into segments to reduce size for ease of installation and shipping. The horizontal bar 21 may be connected by means of insert 60 and fasteners, or an exterior sleeve.

The second component, the diagonal 30, is shown in FIG. 5. The diagonal 30 is comprised of a long member 31 to which is affixed a diagonal bracket 32 at an angle relative to the long member and affixed to one vertical side of the long member by the lower leg of bracket 32C. This diagonal bracket 32 is affixed such that it protrudes from the end of the upper end of the long member 31 allowing the long member 31 to fit inside the inside face of the vertical 23. The diagonal bracket turns horizontal 32b above its lower vertical leg 32a and is affixed to the long member 31 such that it leaves space or a flange gap 33 (FIG. 5A) above the upper corner of the long member 31 then turns vertical creating an upper leg 32c. The lower leg of the diagonal member bracket 32C has a hole 32D as does the upper leg 32C, 32E which are oriented longitudinally once installed. The opposite end of the diagonal 31 has a hole 31B which lines up with the hole in the stirrup bracket 22D once installed. The middle of the diagonal 31 has a hole 31A which lines up with the middle hole 31A of the opposing diagonal 31 through which a bolt or connector connects the two opposing diagonals.

FIG. 6 depicts the installation of the side faces 20. The first side face 20 is installed at trailer's 1 lateral or side extremity by first lifting up the side face 20 into a vertical position such that the horizontal space or flange gap 25 between the top of the vertical 23B and the horizontal leg of the bracket 24b is level with the floor transverse beam 6 lower I-beam flange 6b, then sliding toward the I-beam web 6a until the upper vertical leg 24c of the vertical bracket 24 is pressed flush against the transverse beam webbing 6a. The hole or slot 24D on the upper leg of the vertical bracket 24C lines up with hole 6C drilled into the I-beam webbing 6a. This can occur on the road or curb side of the trailer 1 with either of the two side faces 20 as they have neither a left or right distinction. As is demonstrated by FIG. 6C the flange gap 25 and vertical bracket horizontal leg 24b allows the side face 20 to hang temporarily 13 during installation freeing up the installer place fasteners and other components. The process is repeated for the opposite side as shown in FIG. 6D.

Once the two side faces 20 are slotted onto the lower I-beam flange 6B as shown in FIG. 6 on opposing ends of the transverse beams 6, the diagonals 30 are installed as shown in FIG. 7 by first cradling the lower or bracketless end of the long member 31 into the stirrup bracket 22 affixed on the inside surface of the horizontal member 21 (FIGS. 7A and 7B). As shown in FIG. 8 while the lower end of the diagonal 30 rests cradled in the stirrup bracket 22, the installer is now free to move across the trailer and to the upper end of the diagonal 30 and slot the diagonal bracket's flange gap 33 onto the transverse beam's lower flange 6b opposite the vertical bracket 24 such that the protruding diagonal bracket's lower leg 32a is flush with the bracketless side of the vertical 23 and the diagonal bracket's upper leg 32c is flush with the webbing of the I-beam 6B. This process is repeated for the opposing diagonal 30 as shown in FIGS. 9A and 9B.

FIG. 10 shows an exploded view of the clamp that is formed by the vertical bracket 24 and diagonal bracket 32. This configuration is advantageous and serves a number of functions simultaneously. It forms a common guard-to-trailer attachment location for the vertical and diagonal legs of triangular bracing that is structurally advantageous to resisting the lateral force generated by an impacting car. Creating such a common attachment point reduces to the number of holes that must be drilled in the trailer (or points welded on or clamped). The vertical 24 and diagonal brackets 32 are affixed to their respective members 23, 31 such that there are flange gaps 25,33. The flange gaps 25, 33 allow the brackets to reach around the higher stress area of the transverse beam's lower flange 6b attaching instead to the lower stress area of transverse beam webbing 6c, which along with the attachment positioning at opposing ends of the transverse beam, reduces adverse interactions with floor loads. The vertical bracket flange gap 25 allows the entire side face to be slotted on to the transverse beam flange 6b and temporarily hang while fasteners and other components are assembled. The opposing flange gap 33 and the diagonal 30 similarly rests in place after the diagonal's bracketless end is cradled in the stirrup bracket. These brackets 24, 32 provided to the installer pre-affixed to the guard's structural members, reduces the number of installation steps and parts.

FIG. 11 shows alternate cross-bracing configurations that work with a side face 20 and utilize its stirrup 22 and vertical bracket 24 set up. Combinations of straight, angled or curved variations can work with a diagonal bracket 32 to create the guard to trailer attachment clamp presented in FIG. 10. These variations serve the same purpose of the resisting an impacting car 12 while avoiding floor deflections 11 created during loading and unloading.

Figure 12A:
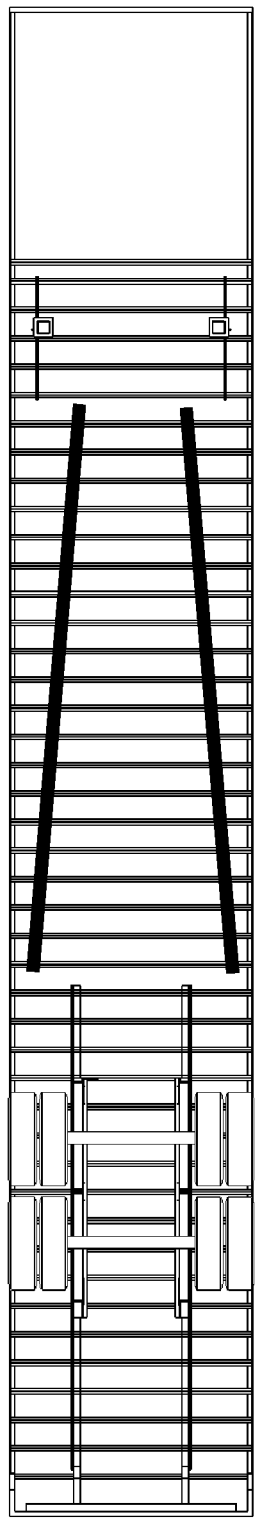
FIG. 12A shows an underside view of a side guard tapered from inset to more outset moving rearward on the trailer linearly.
Figure 12B:
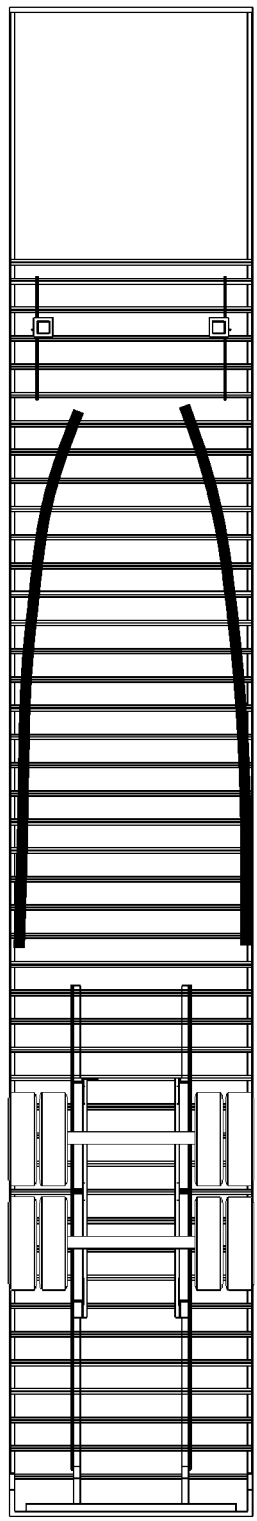
FIG. 12B shows an underside view of a side guard tapered from inset to more outset moving rearward on the trailer in a curved fashion.

Side skirts are often angled or curved to enhance their aerodynamic performance. There is a need that side guards fit such a configuration. FIG. 12A shows a side guard alignment 40 with the forward end of the guard attached at a location inset from the trailer side extremity gradually tapering in straight line to a position closer to the side extremity. 12B shows a side guard alignment with the forward end of the guard attached at a location inset from the trailer side extremity gradually tapering in curved fashion to a position closer to the side extremity. This curve may be a varied in radius, parabolic in shape, convex or concave.

FIG. 13 shows innovative spring loaded aero-skirt retention 60 for rigid side guard frames 70 which works with the common semi-rigid aero-skirt panel 71. The skirt panel 71 is affixed either at its upper portion 72 either flat against the side guard outside face by means such as a bolt or rivet directly to the side guard 10 or trailer, or a tab or ear affixed to side guard or the trailer. Alternately the upper portion of the skirt panel 71 may be affixed in a hinged manner allowing greater rotation at the upper portion. The skirt panel's lower portion is held in place against the side guard 10 by means of an elastic tension member or spring 73 affixed to the lower portion of the skirt panel 71 by means of an eye-bolt, u-shaped shackle or other connector. The spring 73 extends to an interior portion of the trailer and side guard and is affixed to any number of potential existing trailer or side guard 10 components including but not limited to the trailer floor 7, floor transverse beams 6, landing leg 5 supports, trailer axles supports by means of eye-bolts 77, u-shaped connectors 76 existing holes 75 or other means. While a coiled extension spring is shown in FIG. 13 the elastic tension member could be a rubber or elastic bungee-style cord. Configured as shown in FIG. 13 the skirt is held in place by its upper attachment 72 and against the side guard frame 10 by the spring 73. The spring or elastic tension member would be chosen with the appropriate spring constant that would allow the panel 71 to remain pressed against the side guard during highway winds FIG. 13A. Aero-skirt panels are not rigid enough to remain in place at highway speeds and winds by their own elasticity. As configured and as shown in 13B the semi-rigid skirt is allowed to move out away from the trailer when loaded 14 by a grounds obstruction laterally. Likewise 13C shows how the mechanism responds to a force inward or upward, returning to the position shown in 13A once clear of the ground obstruction.

FIG. 14 depicts a similar concept to FIG. 13 to deal with an aero-skirt side guard rail combination 70. In this configuration, the semi-rigid skirt panel 71 is affixed either at its upper portion 72 either flat against the side guard outside face by means such as a bolt or rivet to the directly to the side guard 10 or trailer, or a tab or ear affixed to the trailer. Alternately the upper portion of the panel 71 may be affixed in a hinged manner allowing greater rotation at the upper portion. The skirt panel's lower portion is held in place against the side guard 10 by means of magnetic strips affixed by adhesives or other means to the inside face of the panel 71 placed in alignment with the horizontal guardrail and any other underride guard frame members present at the guard's outside face or extremity. The magnet strength is chosen to be such that the panel will remain in place against the guard an in an aerodynamically advantageous position during highway operations. As configured and as shown in 14A the semi-rigid skirt with magnetic strip 74 affixed 71 breaks free of the magnetic force 15 to move out away from the trailer when loaded 14 by a ground obstruction laterally. Likewise 14B shows how the mechanism responds to a force inward or upward and once clear of the ground obstruction, returning to and remaining against the frame due to the strip's 74 magnetic attraction to the side guardrail and frame.

The invention claimed is:

1. A side underride guard for a trailer, wherein a floor of said trailer is supported by a plurality of transverse beams, comprising:
 a. a first side face, said side face including a horizontal member and a plurality of vertical members, said vertical members having a bottom end and a top end, with said bottom end of said vertical members attached to said horizontal member;
 b. a second side face, said side face including a horizontal member and a plurality of vertical members, said vertical members having a bottom end and a top end, with said bottom end of said vertical members attached to said horizontal member;
 c. a plurality of vertical member attachment brackets, wherein each of said vertical member attachment brackets is attached to said top end of each of said vertical members of said first side face and said second side face;
 d. a plurality of stirrup brackets, wherein each of said stirrup brackets is attached to said horizontal member proximate to said bottom end of each of said vertical members of said first side face and said second side face; and
 e. a plurality of diagonal braces, each of said diagonal braces including a lower end and an upper end wherein each of said diagonal braces extends diagonally from a vertical member bottom end to an opposing vertical member top end, and wherein each of said diagonal brace lower end is captured in said stirrup bracket,
 f. a plurality of diagonal brace attachment brackets wherein each of said diagonal brace attachment brackets is connected to said upper end of each of said diagonal braces, and
 g. a plurality of transverse beam attachment clamps, each of said transverse beam attachment clamps comprised of a vertical member attachment bracket and a diagonal brace attachment bracket.

2. The side underride guard of claim 1 further including an aero skirt.

3. The side underride guard of claim 2 wherein said aero skirt is connected by a plurality of springs to said side underride guard.

4. The side underride guard of claim 2 wherein said aero skirt is connected by a plurality of magnets to said side underride guard.

\* \* \* \* \*